United States Patent
Khayrullin et al.

(10) Patent No.: US 9,637,568 B2
(45) Date of Patent: May 2, 2017

(54) PROCESS FOR SEPARATING COMPONENTS OF A REACTION MIXTURE OBTAINED BY HIGH-PRESSURE POLYMERIZATION OF ETHYLENICALLY UNSATURATED MONOMERS WITH IMPROVED LEVEL CONTROL

(71) Applicant: Basell Polyolefine GmbH, Wesseling (DE)

(72) Inventors: Danir Khayrullin, Bruehl (DE); Michael Deuerling, Weilerswist (DE); Christoph Wolf, Pulheim-Dansweiler (DE); Erich Neumann, Braunschweig (DE); Claudio Fibla, Cologne (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/101,372

(22) PCT Filed: Dec. 3, 2014

(86) PCT No.: PCT/EP2014/076464
§ 371 (c)(1),
(2) Date: Jun. 2, 2016

(87) PCT Pub. No.: WO2015/082568
PCT Pub. Date: Jun. 11, 2015

(65) Prior Publication Data
US 2016/0304631 A1   Oct. 20, 2016

(30) Foreign Application Priority Data
Dec. 4, 2013   (EP) ..................................... 13195653

(51) Int. Cl.
*C08F 2/00* (2006.01)
*C08F 4/00* (2006.01)
(Continued)

(52) U.S. Cl.
CPC ................. *C08F 6/10* (2013.01); *B01J 4/002* (2013.01); *C08F 6/001* (2013.01); *C08F 6/12* (2013.01);
(Continued)

(58) Field of Classification Search
CPC ......... C08F 6/10; C08F 10/02; B01J 19/2415; B01J 2219/1946; B01J 2219/185; B01J 2219/1943; B01D 19/0063; B01D 19/0036
(Continued)

(56) References Cited

U.S. PATENT DOCUMENTS

| 5,200,486 A * | 4/1993 | Beckemeier | C08F 6/28 526/352 |
| 2004/0021080 A1* | 2/2004 | Bidell | B01J 8/001 250/357.1 |

(Continued)

FOREIGN PATENT DOCUMENTS

| WO | WO 02/16019 A2 | 2/2002 |
| WO | WO 0216019 A2 * | 2/2002 |
| WO | WO 2010/081684 A1 * | 7/2010 |

OTHER PUBLICATIONS

PCT International Search Report & Written Opinion mailed Mar. 6, 2015 for PCT/EP2014/076464.

Primary Examiner — William Cheung

(57) ABSTRACT

The present disclosure generally relates to a process for separating polymeric and gaseous components of a reaction mixture obtained by high-pressure polymerization of ethylenically unsaturated monomers in the presence of free-radical polymerization initiators into a gaseous fraction and a liquid fraction in a separation vessel, wherein the filling level of the liquid fraction in the separation vessel is measured by a radiometric level measurement system comprising at least two radioactive sources and at least three (Continued)

radiation detectors, and the filling level is controlled by a product discharge valve which operates based on data coming from the level measurement system.

10 Claims, 2 Drawing Sheets

(51) Int. Cl.
  *C08F 210/00*   (2006.01)
  *B01J 10/00*   (2006.01)
  *B01J 19/18*   (2006.01)
  *C08F 6/10*   (2006.01)
  *C08F 6/00*   (2006.01)
  *C08F 6/12*   (2006.01)
  *G01F 23/288*   (2006.01)
  *C08F 10/02*   (2006.01)
  *B01J 4/00*   (2006.01)

(52) U.S. Cl.
  CPC .......... *C08F 10/02* (2013.01); *G01F 23/2885* (2013.01)

(58) Field of Classification Search
  USPC .................... 526/64, 222, 348; 422/129, 132
  See application file for complete search history.

(56) References Cited

U.S. PATENT DOCUMENTS

2010/0302089 A1* 12/2010 Nistor .................. G01S 11/125
                        342/124
2011/0301307 A1* 12/2011 Littmann ................ B01J 4/008
                        526/64

* cited by examiner

PROCESS FOR SEPARATING COMPONENTS OF A REACTION MIXTURE OBTAINED BY HIGH-PRESSURE POLYMERIZATION OF ETHYLENICALLY UNSATURATED MONOMERS WITH IMPROVED LEVEL CONTROL

This application is the U.S. National Phase of PCT International Application PCT/EP2014/076464, filed Dec. 3, 2014, claiming benefit of priority to European Patent Application No. 13195653.4, filed Dec. 4, 2013, the disclosures of which are incorporated herein by reference in their entirety.

FIELD OF THE INVENTION

The present disclosure relates to a process for separating polymeric and gaseous components of a composition obtained by high-pressure polymerization of ethylenically unsaturated monomers in the presence of free-radical polymerization initiators. In some embodiments, the present disclosure further relates to processes for preparing ethylene homopolymers or copolymers from ethylenically unsaturated monomers in the presence of free-radical polymerization initiators comprising the separation process.

BACKGROUND OF THE INVENTION

Polyethylene is the most widely used commercial polymer. It can generally be prepared by a couple of different processes. Polymerization in the presence of free-radical initiators at elevated pressures was the method first discovered to obtain polyethylene and continues to be a valued process with high commercial relevance for the preparation of low density polyethylene (LDPE).

A normal set-up of a plant for preparing low density polyethylene comprises a polymerization reactor which can be an autoclave or a tubular reactor or a combination of such reactors as well as further equipment. For pressurizing the reaction components, a set of two compressors, a primary and a secondary compressor, is often used. At the end of the polymerization sequence, a high-pressure polymerization unit may include apparatuses like extruders and granulators for pelletizing the resulting polymer. Furthermore, such a polymerization unit may also comprise means for feeding monomers and comonomers, free-radical initiators, modifiers or other substances at one or more positions to the polymerization reaction.

A characteristic of the radical initiated polymerization of ethylenically unsaturated monomers under high pressure is that the conversion of the monomers is often incomplete. For each pass of the reactor, only about 10% to 50% of the dosed monomers are converted in the case of a polymerization in a tubular reactor, and from 8% to 30% of the dosed monomers are converted in case of a polymerization in an autoclave reactor. Accordingly, it is common practice to separate the discharged reaction mixture into polymeric and gaseous components and recycle the monomers. To avoid unnecessary decompression and compression steps, the separation into polymeric and gaseous components is usually carried out in two stages. The monomer-polymer mixture leaving the reactor is transferred to a first separating vessel, frequently called a high-pressure product separator, in which the separation in polymeric and gaseous components is carried out at a pressure that allows for recycling of ethylene and comonomers separated from the monomer-polymer mixture to the reaction mixture at a position between the primary compressor and the secondary compressor. At the operating conditions of the first separation vessel, the polymeric components within the separating vessel are in a liquid state. The level of the liquid phase in the first separating vessel is generally measured by radiometric level measurements and is controlled automatically by a product discharge valve. The liquid phase obtained in the first separating vessel is transferred to a second separation vessel, frequently called a low-pressure product separator, in which a further separation in polymeric and gaseous components takes place at lower pressure. The ethylene and comonomers separated from the mixture in the second separation vessel are fed to the primary compressor, where they are compressed to the pressure of the fresh ethylene feed, combined with the fresh ethylene feed, and the joined streams are further pressurized to the pressure of the high-pressure gas recycle stream.

Measuring the filling level within the first separating vessel is usually carried out by a radiometric level measurement system based on gamma radiation, because such systems are very reliable for extreme processing conditions. The operation principle is based on the properties of gamma rays, which lose intensity as they pass through material(s). Attenuation of the gamma radiation when passing through the vessel is measured by a detector. The intensity of the passing radiation is predictably affected by the type of the material, the density of the material and the total thickness of the object, and by the distance between the gamma ray source and the detector. In the case of two phases of different density inside a vessel, the extent to which the radiation is attenuated is also dependent on the proportion of the two phases in the path of radiation, i.e. on the filling level within the vessel, if one phase is in a gaseous state and the other phase is in a liquid state. High reliability and low maintenance costs of the radiometric measurement systems, even under harsh operating conditions, have been established. Usually the gamma rays used for level measurement are generated by nuclear gamma decay. The penetrating power of the radiation is characterized by its photon energy, expressed in electron volts (eV), which relates to the wavelength of the gamma radiation. As any radioactive isotope decays, the intensity of a gamma source decreases in correspondence to the half-life time of the utilized radioisotope. The most common isotope used for generating gamma radiation for level measurement is cesium-137, which has a photon energy level of 0.66 MeV. Another suitable isotope is cobalt-60, which has an energy level of 1.3 MeV. While the greater penetrating power of this higher energy radiation offers an advantage, the drawback is that cobalt-60 has a shorter half-life time. For measuring the gamma radiation which has passed the separation vessel, different kinds of radiation detectors can be used. Suitable gamma radiation detectors are, for example, ionization chambers, Geiger-Müller tubes or scintillation counter detectors.

A difficulty in ensuring an accurate level of measurement comes from the significant variation in process gas density and composition if different polyethylene grades, especially with significantly different comonomer content, are produced in the same high-pressure production line. In such a case, not only can the density of the gaseous fraction within the separation vessel vary over a very broad range but also the difference between the density of the gaseous fraction and the density of the liquid fraction can become relatively small. In addition, fluctuations of gas properties might simulate level changes which in reality do not exist because an increasing gas density might be interpreted as an increase in the filling level. Fluctuating gas properties accordingly affect the accuracy of the level measurement.

In addition, an accurate level measurement has an impact on the safety of the polymerization process and the consequences if undesired process conditions occur. Pressure apparatuses used as the first separating vessel in a high-pressure polymerization process are usually equipped with an emergency pressure release system comprising an emergency pressure release valve and one or more bursting discs. If the level of the liquid fraction in the separation vessel decreases below a pre-defined minimum value, or rises above a pre-defined maximum value, the polymerization process has to be interrupted. In such a case, a controlled emergency program should be initiated. If such an emergency program is not triggered, an emergency release of hydrocarbons via failing bursting discs to a safe location might be caused. Exchange of the bursting disks on the high pressure equipment will then be necessary, which normally leads to a relatively long plant shut down and loss of production.

New modern world scale plants are designed with a much higher capacity of a single production line than in the past. This results in much stricter requirements for the reliability of the plant because of a smaller number of lines and higher production rates. Furthermore, due to the higher throughput, it is necessary to use separating vessels of increased diameters, and accordingly the measuring distances for the radiometric measurement increases. Moreover, it is advantageous if the service life of the utilized radioactive sources of the decay related decrease in radiation intensity is not too short.

An object of the present disclosure is to overcome the disadvantages of the prior art and provide an improved level measurement system in the first separation vessel of a high-pressure polymerization of ethylenically unsaturated monomers that gives an accurate measurement of the filling level of the liquid fraction in the separation vessel. In addition, the process should allow for a fast grade change between different types of produced low density polyethylenes. It should further allow for operating nuclear radiation sources with a longer service life, and fulfilling the requirements in larger scale polymerization plants and with the production of different polymer grades of different comonomer content and produced under different polymerization conditions.

SUMMARY OF THE INVENTION

The present disclosure generally relates to a process for separating polymeric and gaseous components of a reaction mixture obtained by high-pressure polymerization of ethylenically unsaturated monomers in the presence of free-radical polymerization initiators, the process comprising the steps of entering the reaction mixture into a separation vessel; separating the reaction mixture into a gaseous fraction and a liquid fraction; withdrawing the gaseous fraction from the top of the separation vessel and withdrawing the liquid fraction from the bottom of the separation vessel, wherein the separation is carried out at a pressure of from 15 MPa to 50 MPa and a temperature of from 120° C. to 300° C.; wherein the filling level of the liquid fraction in the separation vessel is measured by a radiometric level measurement system comprising at least two radioactive sources and at least three radiation detectors, and the filling level is controlled by a product discharge valve which operates based on data coming from the level measurement system, and wherein radioactive sources are installed in at least two different heights of the separation vessel, and radiation detectors are installed in at least three different heights of the separation vessel.

Furthermore, we have found a process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor comprising such a process for separating polymeric and gaseous components.

DETAILED DESCRIPTION OF THE INVENTION

Figure 1:
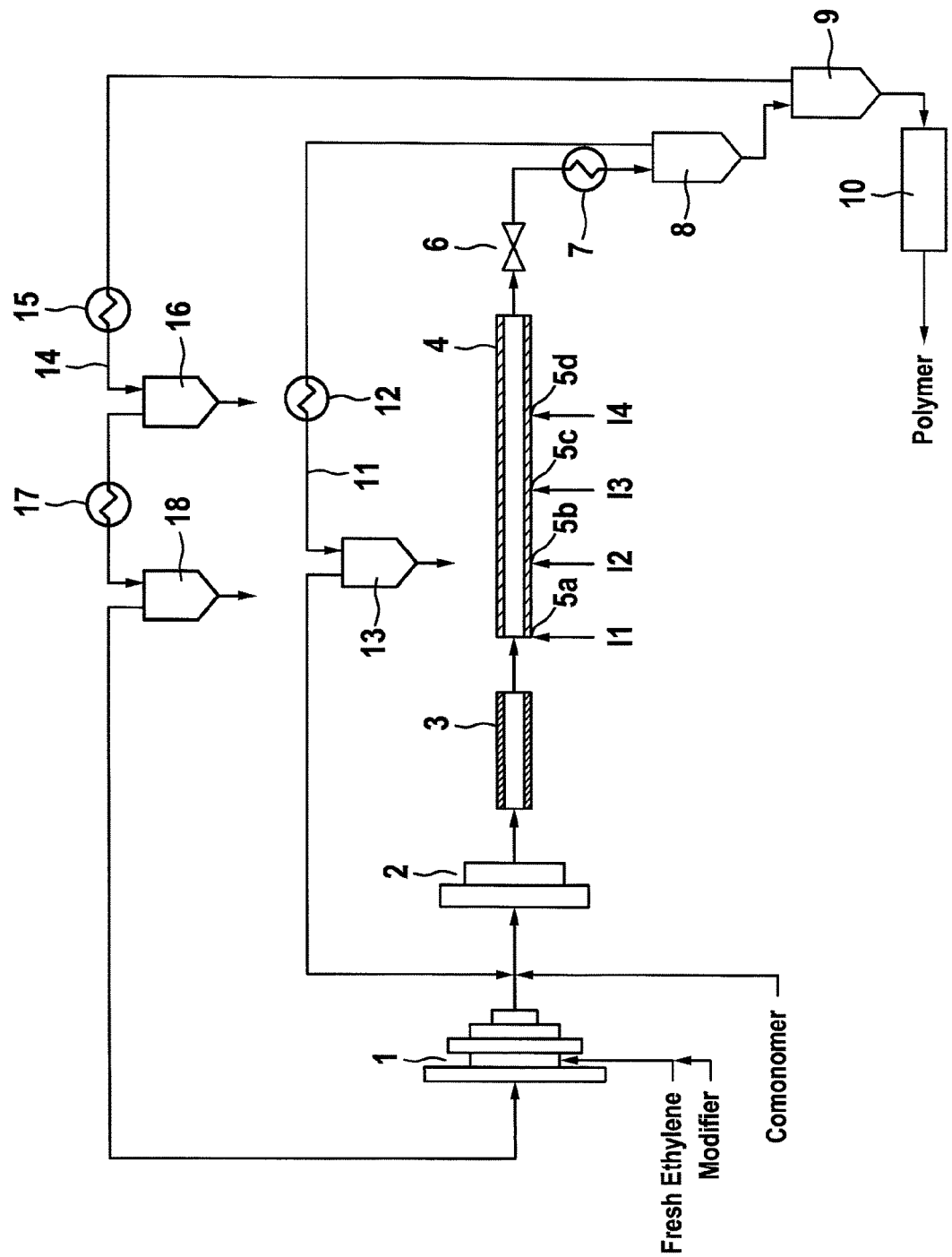
FIG. 1 shows schematically a typical set-up for a suitable tubular polymerization reactor, without restricting the disclosure to the embodiments described therein.

The process of the present disclosure relates to the separation polymeric and gaseous components of a reaction mixture obtained by high-pressure polymerization of ethylenically unsaturated monomers in the presence of free-radical polymerization initiators. In some embodiments, the high-pressure polymerization is a homopolymerization of ethylene or a copolymerization of ethylene with one or more other monomers, provided that these monomers are free-radically copolymerizable with ethylene under high pressure. Examples of suitable copolymerizable monomers are $\alpha,\beta$-unsaturated $C_3$-$C_8$-carboxylic acids, such as maleic acid, fumaric acid, itaconic acid, acrylic acid, methacrylic acid and crotonic acid, derivatives of $\alpha,\beta$-unsaturated $C_3$-$C_8$-carboxylic acids, e.g. unsaturated $C_3$-$C_{15}$-carboxylic esters, including esters of $C_1$-$C_6$-alkanols, or anhydrides, such as methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, such as vinyl acetate, can be used as comonomers. Propene, 1-butene, 1-hexene, acrylic acid, n-butyl acrylate, tert-butyl acrylate, 2-ethylhexyl acrylate, vinyl acetate or vinyl propionate may be used as the comonomer.

In the case of copolymerization, the proportion of comonomer or comonomers in the reaction mixture is from 1 to 50% by weight, such as from 3 to 40% by weight, based on the amount of monomers, i.e. the sum of ethylene and other monomers. Depending on the type of comonomer, the comonomers may be fed at more than one point to the reactor set-up. In certain embodiments, the comonomers are fed to the suction side of the secondary compressor.

For the purposes of the present disclosure, polymers or polymeric materials are all substances which are made up of at least two monomer units, including but not limited to low density polyethylenes having an average molecular weight $M_n$ of more than 20 000 g/mole. The term "low density polyethylene" is meant to include ethylene homopolymers and ethylene copolymers. The process of the present disclosure can also be advantageously employed in the preparation of oligomers, waxes and polymers having a molecular weight $M_n$ of less than 20 000 g/mole.

Possible initiators for starting the free-radical polymerization in the reaction zones are, in general, all substances that can produce radical species under the conditions in the polymerization reactor, for example, oxygen, air, and azo compounds or peroxidic polymerization initiators. In one embodiment of the disclosure, the polymerization is carried out by using oxygen, either fed in the form of pure $O_2$ or as air. In case of initiating the polymerization with oxygen, the initiator may first be mixed with the ethylene feed and then fed to the reactor. In such a case, it is not only possible to feed a stream comprising monomer and oxygen to the beginning of the polymerization reactor but also to one or more points along the reactor, creating two or more reaction zones. Initiation using organic peroxides or azo compounds also represents an additional embodiment of the present disclosure. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or mixtures of various initiators. A large range of initiators, such as peroxides, are commercially available, for example the products of Akzo Nobel offered under the trade names Trigonox® or Perkadox®.

In some embodiments, peroxidic polymerization initiators for use in the present disclosure include 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5di(tert-butylperoxy)hexane, tert-butyl cumyl peroxide, di-tert-butyl peroxide and 2,5-dimethyl-2,5-di(tert-butylperoxy)hex-3-yne, di-(2-ethylhexyl)peroxydicarbonate and tert-butyl peroxy-2-ethylhexanoate.

The initiators can be employed individually or as a mixture in concentrations of from 0.1 mol/t to 50 mol/t of polyethylene produced, such as from 0.2 mol/t to 20 mol/t, in each reaction zone. In one embodiment of the present disclosure, the free-radical polymerization initiator, which is fed to a reaction zone, is a mixture of at least two different azo compounds or organic peroxides. If such initiator mixtures are used, in certain embodiments these are fed to all reaction zones. There is no limit for the number of different initiators in such a mixture, however the mixtures in certain embodiments are composed of from two to six, including two, three or four different initiators. In further embodiments, mixtures of initiators which have different decomposition temperatures are used.

It may be advantageous to use the initiators in the dissolved state. Examples of suitable solvents are ketones and aliphatic hydrocarbons, such as octane, decane and isododecane, and also other saturated $C_8$-$C_{25}$ hydrocarbons. The solutions of the present disclosure may comprise initiators or initiator mixtures in proportions of from 2 to 65% by weight, including from 5 to 40% by weight and from 8 to 30% by weight.

In high-pressure polymerization, the molecular weight of the polymers to be prepared can be altered in some embodiments by the addition of modifiers, which act as chain-transfers agents. Examples of suitable modifiers are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol, saturated aliphatic aldehydes such as propionaldehyde, 1-olefins such as propene, 1-butene or 1-hexene, and aliphatic hydrocarbons such as propane.

The high-pressure polymerization is, in some embodiments, carried out at pressures of from 110 MPa to 500 MPa, such as from 160 MPa to 350 MPa and from 200 MPa to 330 MPa for polymerization in a tubular reactor, and with pressures of from 110 MPa to 300 MPa, including from 120 MPa to 280 MPa for polymerization in an autoclave reactor. In further embodiments, the polymerization temperatures are in the range of from 100° C. to 350° C., including from 180° C. to 340° C. from 200° C. to 330° C. for polymerization in a tubular reactor, and in the range of from 110° C. to 320° C., such as from 120° C. to 310° C., for polymerization in an autoclave reactor.

The polymerization can be carried out with all types of high-pressure reactors appropriate for high-pressure polymerization. Suitable high-pressure reactors are, for example, tubular reactors, autoclave reactors and combinations of such reactors. In some embodiments, the high-pressure reactors are tubular reactors or autoclave reactors.

Common high-pressure autoclave reactors include stirred reactors having a length-to-diameter ratio of from 2 to 30, including from 2 to 20. Such autoclave reactors have one or more reaction zones, such as from 1 to 6 reaction zones and from 1 to 4 reaction zones. The number of reaction zones depends from the number of agitator baffles which separate individual mixed zones within the autoclave reactor.

Appropriate tubular reactors are basically long, thick-walled pipes, which are usually from about 0.5 km to 4 km, such as from 1 km to 3 km and from 1.5 km to 2.5 km long. The inner diameter of the pipes may be in the range of from about 30 mm to 120 mm, including from 60 mm to 100 mm. Such tubular reactors have, in certain embodiments, a length-to-diameter ratio of greater than 1000, such as from 10000 to 40000 and from 25000 to 35000.

In certain embodiments, tubular reactors for use in the present technology have at least two reaction zones, such as from 2 to 6 reaction zones and from 2 to 5 reaction zones. The number of reaction zones is given by the number of feeding points for the initiator. Such a feeding point can, for example, be an injection point for a solution of azo compounds or organic peroxides. Fresh initiator is added to the reactor, where it decomposes into free radicals and initiates further polymerization. The generated heat of the reaction raises the temperature of the reaction mixture, since more heat is generated than can be removed through the walls of the tubular reactor. The rising temperature increases the rate of decomposition of the free-radical initiators and accelerates polymerization until essentially all of the free-radical initiator is consumed. Thereafter, no further heat is generated and the temperature decreases again since the temperature of the reactor walls is lower than the temperature of the reaction mixture. Accordingly, the part of the tubular reactor downstream of an initiator feeding point in which the temperature rises is referred to as the reaction zone, while the part thereafter, in which the temperature decreases again, is predominantly a cooling zone. The amount and nature of added free-radical initiators determines how much the temperature rises and allows for adjusting of that value. In some embodiments, the temperature rise is set to be in the range of from 70° C. to 170° C. in the first reaction zone and 50° C. to 130° C. for the subsequent reaction zones, depending on the product specifications and the reactor configuration.

The compression of the reaction gas composition to the polymerization pressure may be carried out by at least two sequentially operating compressors, of which a primary compressor first compresses the reaction gas composition to a pressure of from 10 MPa to 50 MPa, and a secondary compressor, which is sometimes designated as a "hyper compressor," further compresses the reaction gas composition to the polymerization pressure of from 110 MPa to 500 MPa. In further embodiments, the primary compressor and the secondary compressor are multistage compressors. It is further possible to separate one or more stages of one or both of these compressors and divide them into separate compressors. However, a series of one primary compressor and one secondary compressor is generally used for compressing the reaction gas composition to the polymerization pressure. In such cases, the whole primary compressor may be designated as the primary compressor. However, it is also common to designate the one or more first stages of the primary compressor, which compress the recycle gas from the low-pressure product separator to the pressure of the fresh ethylene feed, as a booster compressor and then only the one or more subsequent stages as primary compressor(s), although they are all part of one apparatus.

Commonly the polymerization apparatus comprises, beside the polymerization reactor, a high-pressure gas recycle line and a low-pressure gas recycle line for recycling unreacted monomers to the polymerization process. The reaction mixture obtained in the polymerization reactor is transferred to a first separation vessel, frequently called a high-pressure product separator, and separated into a gaseous fraction and a liquid fraction at a pressure of from 15 MPa to 50 MPa. In some embodiments, the gaseous fraction withdrawn from the first separation vessel is fed via the high-pressure gas recycle line to the suction side of the secondary compressor. In the high-pressure gas recycle line, the gas may be purified by several purifications steps from undesired components such as entrained polymer or oligomers. The liquid fraction withdrawn from the first separation vessel, which may still comprise dissolved monomers such as ethylene and comonomers in an amount of, e.g. 20 to 40% of weight, is transferred to a second separation vessel, frequently called a low-pressure product separator, and further separated, at reduced pressure, such as at an absolute pressure in the range of from 0.1 to 0.5 MPa, into polymeric and gaseous components. The gaseous fraction withdrawn from the second separation vessel is fed via the low-pressure gas recycle line to the primary compressor, such as to the foremost of the stages. Also, the low-pressure gas recycle line may comprise several purifications steps for purifying the gas from undesired components.

In additional embodiments, the recycled gas coming from the low-pressure gas recycle line is compressed by the first stages of the primary compressor to the pressure of the fresh feed of ethylenically unsaturated monomers, such as ethylene, thereafter combined with the fresh gas feed, and the combined gases are further compressed in the primary compressor to a pressure of from 10 MPa to 50 MPa. In certain embodiments, the primary compressor comprises five or six compression stages, two or three before adding the fresh gas and two or three after adding the fresh gas. The secondary compressor has, in certain embodiments, two stages; a first stage, which compresses the gas from about 30 MPa to about 120 MPa, and a second stage, which further compresses the gas from about 120 MPa to the final polymerization pressure.

Different configurations for suitable polymerization apparatuses such as, for example, autoclave reactors are also possible.

FIG. 1 shows schematically a typical set-up for a suitable tubular polymerization reactor, without restricting the disclosure to the embodiments described therein.

The fresh ethylene, which is usually under a pressure of 1.7 MPa, is first compressed to a pressure of about 30 MPa by means of a primary compressor (1) and then compressed to the reaction pressure of about 300 MPa using a secondary compressor (2). The molecular weight regulator is added to primary compressor (1). The reaction mixture leaving the primary compressor (2) is fed to pre-heater (3), where the reaction mixture is pre-heated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). In some embodiments, the length of the pipe is from about 0.5 km to 4 km, such as from 1.5 km to 3 km and from 2 km to 2.5 km. The inner diameter of the pipe is, in some embodiments, in the range of from about 30 mm to 120 mm and from 60 mm to 100 mm.

The tubular reactor (4) shown in FIG. 1 has four spatially separated initiator injection points (5a) to (5d) for feeding initiators or initiator mixtures I1 to I4 to the reactor and four reaction zones. By feeding suitable free-radical initiators, which decompose at the temperature of the reaction mixture, to the tubular reactor the polymerization reaction starts. The generated heat of the reaction raises the temperature of the reaction mixture, since more heat is generated than can be removed through the walls of the tubular reactor. The rising temperature increases the rate of decomposition of the free-radical initiators and accelerates polymerization until all the free-radical initiators are consumed. Thereafter, no further heat is generated and the temperature decreases again since the temperature of the reactor walls is lower than that of the reaction mixture. Accordingly, the part of the tubular reactor downstream of an initiator injection point, in which the temperature rises, is the reaction zone, while the part thereafter, in which the temperature decreases again, is predominantly a cooling zone.

The amount and nature of added free-radical initiators determines how much the temperature rises and accordingly allows for adjustment of that value. In some embodiments, the temperature rise in the first reaction zone is in the range of from 70° C. to 170° C. and 50° C. to 130° C. for the subsequent reaction zones, depending on the product specifications and reactor configuration. The reaction mixture leaves the tubular reactor (4) through a high-pressure letdown valve (6) and passes a post reactor cooler (7). Thereafter, the resulting polymer is separated off from unreacted ethylene and other low molecular weight compounds (monomers, oligomers, polymers, additives, solvent, etc.) by means of a first separation vessel (8) and a second separation vessel (9), discharged and pelletized via an extruder and granulator (10).

The ethylene and comonomers which have been separated off in the first separation vessel (8) are fed back to the inlet end of the tube reactor (4) in the high-pressure circuit (11) at 30 MPa. They are first freed from other constituents in at least one purification stage and then added to the monomer stream between primary compressor (1) and secondary compressor (2). FIG. 1 shows one purification stage consisting of a heat exchanger (12) and a separator (13). It is however also possible to use a plurality of purification stages. The high-pressure circuit (11) usually separates waxes.

The ethylene which has been separated off in the second separation vessel (9), which further comprises, inter alia, the major part of the low molecular weight products of the polymerization (oligomers) and the solvent, is worked up in the low-pressure circuit (14) at an absolute pressure of from about 0.1 to 0.5 MPa in a plurality of separators, with a heat exchanger being located between each of the separators. FIG. 1 shows two purification stages consisting of heat exchangers (15) and (17) and separators (16) and (18). It is however also possible to use only one purification stage or more than two purification stages. The low-pressure circuit (14) may separate oil and waxes.

Different configurations for suitable tubular polymerization reactor are also possible. It can be advantageous to add the monomers not only at the inlet of the reactor tube but to feed them, possibly cooled, at a plurality of different points to the reactor. This feeding may be done at the beginning of additional reaction zones and if oxygen or air is used as an initiator, which may be added to the monomer feed in the primary compressor.

According to the present disclosure, the process for separating polymeric and gaseous components of a reaction mixture obtained by high-pressure polymerization of ethylenically unsaturated monomers in the presence of free-radical polymerization initiators comprises the steps of entering the reaction mixture into a separation vessel; separating the reaction mixture into in a gaseous fraction and a liquid fraction; and withdrawing the gaseous fraction from the top of the separation vessel and withdrawing the liquid fraction from the bottom of the separation vessel. In certain embodiments, the separation is carried out at a pressure of from 15 MPa to 50 MPa, such as from 20 MPa to 30 MPa, and a temperature of from 120° C. to 300° C., including from 220° C. to 290° C. for ethylene homopolymers and from 130° C. to 260° C. for ethylene copolymer. At the conditions of operating the separation vessel, the polymeric components within the separating vessel are in liquid state.

The separation vessel may be a separation vessel of a vertically arranged cylindrical shape, with a ratio of length to diameter L/D of from 4 to 10, such as from 5 to 8. The values for the vessel length and the vessel diameter refer to the inner dimensions. In some embodiments, the lower end of the separation vessel is formed as a cone, where the height of the cone is included in the vessel length. The filling level of the liquid fraction in the separation vessel is measured by radiometric level measurement system and is controlled by a product discharge valve, which operates based on data coming from the level measurement system. The product discharge valve may be hydraulically or pneumatically operated, and controlled by a level controller, which converts the data obtained from the level measurement system into a control signal for the product discharge valve. The filling level may be kept in a range of from a pre-defined minimum filling level to a predefined maximum filling level.

The separation vessel is, in some embodiments, equipped with an inlet pipe for introducing the reaction mixture into the separation vessel, where the inlet pipe extends vertically from the top into the separation vessel and the inlet pipe is centrally arranged in the separation vessel. For inlet pipes, the ratio of the inner diameter of the inlet pipe at its lower end, i.e. at the outlet of the pipe, and the inner diameter of the separating vessel in its cylindrical part is in the range of from 0.2 to 0.4, including from 0.22 to 0.35. The ratio of the inner diameter of the inlet pipe at its lower end to the inner diameter of the separating vessel in its cylindrical part may be achieved by utilizing, as an inlet pipe, a tube which widens in its lower part. The inlet pipe can be remounted in further embodiments, i.e. pulled out of the separation vessel, by disconnecting a special manhole flange on top of the vessel.

According to one embodiment of the present disclosure, the inlet pipe extends for a distance into the separation vessel which is from 25% to 50% of the length of the separation vessel, including from 30% to 40% of the length of the separation vessel.

It is further preferred that the outlet for withdrawing the gaseous fraction from the separation vessel is located at the top of the separation vessel. Consequently it is also preferred that the distance from the lower end of the inlet pipe to outlet for withdrawing the gaseous fraction from the separation vessel is from 25% to 50% of the length of the separation vessel and more preferably from 30% to 40% of the length of the separation vessel.

In some embodiments, the process for separating polymeric and gaseous components is further characterized in that the separation vessel is equipped with at least two radioactive sources and at least three radiation detectors for the radiometric level measurement, where the radioactive sources are installed in at least two different heights of the separation vessel, and radiation detectors are installed in at least three different heights of the separation vessel. In further embodiments, the radioactive sources are point sources and the radiation detectors are point detectors, and attenuation of the radiation when passing through the separation vessel is measured. In certain embodiments, the radiation passing through the separation vessel is continuously measured. Compared to combinations of one or more rod or line sources and one or more point detectors or one or more point sources and one or more rod or line detectors or one or more rod or line sources and one or more rod or line detectors, the utilization of a combination of at least two point sources and at least three point detectors brings about a higher accuracy of the level measurement in combination with less intense radioactive sources.

In some embodiments, the separation vessel is furnished with from 2 to 4 radioactive sources, which are installed at 2 to 4 different heights of the separation vessel.

The separation vessel is, in certain embodiments, equipped with from 3 to 12, from 4 to 10 and from 5 to 9 radiation detectors. The radiation detectors are installed in at least three different heights of the separation vessel, such as from 3 to 8 different heights of the separation vessel and from 4 to 6 different heights of the separation vessel. In further embodiments, at least two, including from 2 to 4 and two or three radiation detectors, are installed at the highest height of the installed radiation detectors, and at least two, such as from 2 to 4 and two or three radiation detectors, are installed at the lowest height of the installed radiation detectors. In some embodiments, only one radiation detector is installed at the heights between the highest height and the lowest height.

In further embodiments, the radiation detectors are point detectors which are installed within or close to oriented cavities in the wall of the separation vessel, and the cavities are oriented along a line running from a radioactive source to the radiation detectors. Such cavities may be prepared by drilling a hole into the wall of the separation vessel, wherein the hole does not go through the wall but keeps sufficient material such that the separation vessel can withstand the applied pressure. In some embodiments, suitable holes have a diameter of from 2 mm to 200 mm, such as from 10 mm to 100 mm and from 20 mm to 80 mm, and the distance from the end of the hole and the inner surface of the separation vessel, i.e. the thickness of the kept wall material, is from 2 mm to 200 mm, including from 5 mm to 100 mm and from 10 mm to 20 mm. By installing the detectors within the oriented cavities or close to the oriented cavities, the amount of wall material which the radiation coming from a source has to pass before reaching a detector is significantly reduced. In some embodiments, the radiation detectors are mounted on a nozzle inserted into the oriented cavities. These nozzles can be constructed in a way that, after insertion of the nozzle into the cavity and fixation of the nozzle at the separation vessel wall, the detecting unit of the detector is positioned within the cavity or the detecting unit of the detector is positioned outside the wall. According to one embodiment of the present disclosure, the detectors are cooled, such as by water or air.

Suitable isotopes used for generating gamma radiation for the level measurement according to the present invention are any isotopes commonly used in industry, such as cesium-137 and cobalt-60. The radioactive materials may be sealed in specially constructed capsules to comply with safety requirements.

In further embodiments, the radiation sources are point sources which are installed at a position within the separation vessel or within the wall of the separation vessel. For installing the radiation sources within the separation vessel, it is possible to drill holes having a diameter of from 2 mm to 200 mm, including from 10 mm to 100 mm, through the separation vessel wall. The radiation sources are placed into insertion nozzles which are inserted into the holes and mounted pressure tight to the separation vessel wall. In certain embodiments, the insertion nozzles are constructed in a way that, after insertion of the nozzle, the radiation source is located within the separation vessel having a distance to the inner surface of the wall of from 5 mm to 500 mm, including from 10 mm to 50 mm. In an alternative embodiment, the sources are installed similarly to the radiation detectors in oriented cavities which do not pass the separation vessel wall. These oriented cavities may be constructed in the same way with identical dimensions as the oriented cavities for installing the radiation detectors.

The separation vessel may be equipped with an emergency pressure release system comprising an emergency pressure release valve and one or more bursting discs. In one embodiment of the present disclosure, the filling level is kept in a range of from a pre-defined minimum filling level to a pre-defined maximum filling level and an emergency shutdown program is started if the filling level raises above the maximum filling level, or decreases below the minimum filling level, and the emergency shutdown program, which is started if the filling level raises above the maximum filling level, is started based on data coming from one or more radiation detectors installed at the highest height of the installed radiation detectors. In addition, the emergency shutdown program, which is started if the filling level decreases below the minimum filling level, is started based on data coming from one or more radiation detectors installed at the lowest height of the installed radiation detectors.

The installation of more than one radiation detector at the highest position of the installed radiation detectors, which positions correspond to the pre-defined maximum filling level, and the installation of more than one radiation detector at the lowest position of the installed radiation detectors, which positions correspond to the pre-defined minimum filling level, bring about the advantage of an improved reliability of detecting a filling level which requires a start of the emergency shutdown program. Installing more than one radiation detector at the highest position and more than one radiation detector at the lowest position of the installed radiation detectors ensures that a necessary shutdown is initiated even if a defect radiation detector fails to recognize that the filling level in the separation vessel rose above the maximum filling level or decreased below the minimum filling level. On the other hand, since an emergency shutdown program always includes an interruption of the production and therefore causes financial losses, unnecessarily running an emergency shutdown program should be avoided. Accordingly, it is especially beneficial to have enough radiation detectors at one height that it is possible to start an emergency shutdown program only when more than one radiation detector records a filling level above the maximum filling level or below the minimum filling level. It is consequently beneficial to install two or three radiation detectors at the highest height of the installed radiation detectors, and two or three radiation detectors at the lowest height of the installed radiation detectors, and start an emergency shutdown program if, in case two radiation detectors are installed at the same height, one of the two radiation detectors records a filling level above the maximum filling level or below the minimum filling level or, in case three radiation detectors are installed at the same height, two of the three radiation detectors record a filling level above the maximum filling level or below the minimum filling level.

The intensity loss of gamma radiation, which is used for measuring the filling level, depends on the density and composition of the materials. The densities of the gaseous fraction and the liquid fraction in a separating vessel, according to the process of the present disclosure, not only vary with the pressure and the temperature within the separating vessel but also with the monomer composition of the resulting polymer. In certain embodiments, the density of the gaseous fraction in the first separation vessel can vary from 150 to 450 kg/m$^3$, and the density of the liquid phase can be in the range of from 550 to 800 kg/m$^3$, depending on the type of comonomer, the concentration of comonomer and operating conditions. Moreover, the radiation attenuation coefficient of ethylene comonomers also depends on the kind of comonomer. In the case of ethylene comonomers with high comonomer contents, the difference between the radiation attenuation of gaseous material and the radiation attenuation of liquid material can become relatively small, which further complicates the control of the filling level.

According to one embodiment of the present disclosure, in the process of measuring the filling level of the liquid fraction in the separation vessel, data coming from one or more radiation detectors installed at the highest height of the installed radiation detectors are utilized as online compensation signals regarding the radiation attenuation of the gaseous fraction within the separation vessel. The attenuation of the gaseous material, which is present in the separation vessel at the time of the measurement, is therefore used as a compensation signal.

The radiation attenuation of a gaseous material changes with conditions like temperature or pressure, and with the gas composition which depends, inter alia, on the composition and quantity of co-monomer(s) and/or composition and quantity of modifier fed to the system. Fluctuating gas properties thus have an impact on the accuracy of a level measurement. The properties may simulate changes that do not exist and, as a consequence, could cause product quality variations or even lead to serious safety problems. Feeding actual information to the level controller brings about the advantage of a much higher accuracy level because the radiation attenuation of the gaseous fraction within the separation vessel is not calculated based on previously carried out calibration measurements, data of pressure and temperature in the separation vessel, and an assumption on the polymer composition; but is directly determined. This determination is particularly advantageous if the difference between the radiation attenuation of the gaseous fraction and the radiation attenuation of the liquid fraction becomes small, or if more severe fluctuations of process gas properties appear, especially in the case of grade changes or polymerization start-up.

The pressure of the reaction mixture obtained in the high-pressure polymerization may be reduced by passing the mixture through the high-pressure let-down valve arranged downstream of the polymerization reactor. The reaction mixture may then pass an after cooler or product cooler, which is supplied with hot water as a cooling medium, and fed to the separation vessel for being separated into a liquid fraction and a gaseous fraction. For cooling the reaction mixture and/or removing impurities from the polymer products, it is possible that cold ethylene is added to the reaction mixture prior to entering the first separating vessel. It is also possible to separately feed cold ethylene to the separating vessel. In some embodiments, the reaction mixture is fed into the separation vessel as obtained by the high-pressure polymerization, i.e. without having added to the reaction mixture any further components such as cold ethylene.

The gaseous fraction of the reaction mixture withdrawn from the top of the separating vessel is usually fed to the high pressure recycle stream and, after purification and cooling, returned to the suction side of the secondary compressor. For purifying, the gas exiting the separation vessel may first be fed to a heat exchanger, in which the gas is cooled by hot water and thereafter transferred to a separator, in which most of the carried over polymeric and oligomeric materials and impurities are separated from the gas. By passing additional cooling and separating steps, the gas may be further purified.

The liquid fraction of the reaction mixture withdrawn from the bottom of the separating vessel may be transferred to a second separation vessel, where dissolved low molecular compounds, such as ethylene, are further separated off at reduced pressure.

Figure 2:
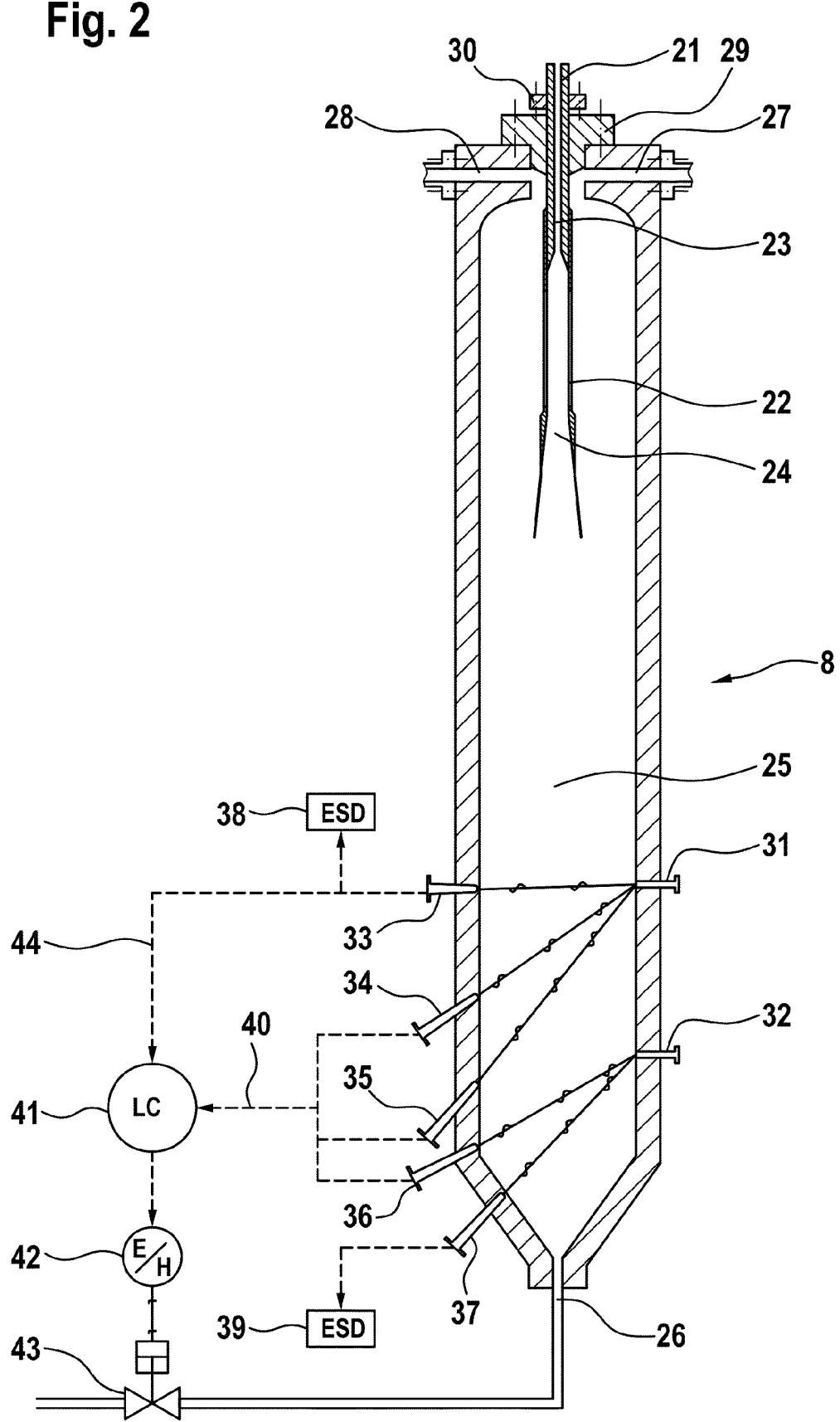
FIG. 2 shows schematically a cross-section of a separation vessel suitable for the separating process of the present disclosure.

FIG. 2 shows schematically a cross-section of a separation vessel suitable for the separating process of the present disclosure.

The reaction mixture leaving the polymerization reactor enters separation vessel (8) from the top through a piping (21) which transforms in an inlet pipe (22) which widens at its lower end. Inlet pipe (22) has in its upper part before widening (23) a larger wall thickness to withstand higher pressures. In the region of increasing diameter (24), the wall thickness gets larger again to withstand vibrations and improve the mechanical stability of that region.

The internal space (25) of the separation vessel (8) is partly filled with a liquid fraction of the reaction mixture, i.e. with molten polymer containing dissolved gaseous components. The liquid fraction exits the separation vessel at the bottom through piping (26). The gaseous fraction leaves the separation vessel at the top. FIG. 2 shows two outlets (27) and (28) for the gaseous fraction; it is however also possible to design the separation vessel (8) with one or three, or four or more outlets for the gaseous fraction.

At the top, the separation vessel is closed by a removable cover (29), to which the inlet pipe is removably connected via flange (30).

For measuring the filling level, the separation vessel is equipped with two radioactive sources (31) and (32), which are located at different heights. FIG. 2 shows five gamma ray detectors (33), (34), (35), (36), and (37), which are positioned at different heights. The detectors are installed in a manner such that detectors in a higher position, in the configuration shown in FIG. 2 detectors (33), (34), and (35), measure predominantly radiation coming from the upper radioactive source, here radioactive source (31). Conversely, detectors in a lower position, in the configuration shown in FIG. 2 detectors (36) and (37), measure radiation coming from the lower radioactive source, here radioactive source (32). It is possible that, at some heights of the separation vessel, more than one radiation detector is installed at the same height (not visible in the cross-section depicted in FIG. 2). In some embodiments, more than one radiation detector is installed at the same height at the highest position (33) and more than one radiation detector is installed at the same height at the lowest position (37). In further embodiments, three radiation detectors are installed at the highest position (33) and two radiation detectors are installed at the lowest position (37). The radiation detectors shown in FIG. 2 comprise a sensing element for recording the radiation intensity, and a transmitter for converting the measured information into an electric signal.

The electrical signals coming from the one or more radiation detectors (33) are sent to an emergency shutdown program (38), which starts if the filling level within the separation vessel rises above the maximum filling level. The electrical signals coming from the one or more radiation detectors (37) are sent to an emergency shutdown program (39), which starts if the filling level within the separation vessel decreases below the minimum filling level. The electrical signals coming from radiation detectors (34), (35), and (36) are sent via lines (40) to a level controller (41), which determines the actual filling level, and transmits a control signal to an electric-to-hydraulic converter (42), which converts the electrical output of level controller (41) to a hydraulic signal for setting the opening position of the product discharge valve (43). To improve the accuracy of the level measurement, the electrical signals coming from the one or more radiation detectors (33) are also sent as compensation signals for compensating density and compositional effects of the gaseous fraction via line (44) to level controller (41).

In certain embodiments, the cylindrical part of the separation vessel is efficiently heated by means of coils or a jacket or heating panels, through which high or medium pressure saturated steam or pressurized water at a temperature of from 120 to 300° C. is passed, and the cone is more intensively heated by means of coils or a jacket or heating panels, through which high or medium pressure saturated steam or pressurized water at temperature of from 120 to 300° C. is passed.

In one embodiment of the present disclosure, the surfaces within the separation vessel, which are in contact with the liquid fraction, have an average roughness Ra of from 0.05 µm to 50 µm, such as from 0.1 µm to 5 µm and from 0.1 µm to 3.2 µm. In some embodiments, the low roughness is achieved by grinding or polishing of the surface. As a consequence of the low adhesion of the liquid fraction to the surfaces, the separation vessel shows no fouling. This property results in an improved polymer quality with respect to gels and long operation periods of the separation vessel, which can be several years, such that no inner cleaning is required.

Typical volumes for separation vessels suitable for the separating process according to the present disclosure are, dependent of plant capacity and dedicated products, in the range from 4 m$^3$ to 20 m$^3$ m for high-pressure polymerization plants with an annual capacity of 80,000 to 500,000 tons of LDPE.

In certain embodiments, the level of the liquid fraction in the separation vessel is maintained as low as reasonably practical to minimize the probability that polymeric material polymer is carried over from the separation vessel to the high-pressure recycle gas system and to minimize the residence time of the polymer in the separation vessel to reduce the risk of gel formation.

The separating process according to the present disclosure brings about a high accuracy in measuring the filling level of the liquid fraction in the separation vessel. The improved arrangement of radioactive sources and detectors provides for a reliable measurement of the filling level with lower radiation intensity, even in larger scale polymerization plants and with the production of different polymer grades of different comonomer content under different polymerization conditions. This process beneficially allows for safer and more reliable operation of the polymerization unit and also allows operating the radioactive sources with an extended servile life. The accurate level measurement further allows emptying the separation vessel to a high extend by lowering the filling level if wished, for example by a grade change or plant shut-down, and permits a fast grade change between different types of low density polyethylene products with less production of off-spec material. Furthermore, by carrying out the separation of the reaction mixture according to the present disclosure, the contamination of the final polymers by gels is reduced.

The process for separating polymeric and gaseous components of a reaction mixture obtained by high-pressure polymerization of ethylenically unsaturated monomers according to the present disclosure can advantageously be utilized as part of a process for preparing ethylene homopolymers or copolymers.

Accordingly, the present disclosure also encompasses a process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor comprising such a process for separating polymeric and gaseous component. In some embodiments, the polymerization is carried out in one or more tubular reactors or autoclave reactors or combinations of such reactors.

What is claimed is:

1. A process for separating polymeric and gaseous components of a reaction mixture obtained by high-pressure polymerization of ethylenically unsaturated monomers in the presence of free-radical polymerization initiators comprising the steps of: entering the reaction mixture into a separation vessel; separating the reaction mixture into in a gaseous fraction and a liquid fraction; and withdrawing the gaseous fraction from the top of the separation vessel and withdrawing the liquid fraction from the bottom of the separation vessel, wherein the separation is carried out at a pressure of from 15-50 MPa and a temperature of from 120-300° C.; the filling level of the liquid fraction in the separation vessel is measured by a radiometric level measurement system comprising at least two radioactive sources and at least three radiation detectors, and the filling level is controlled by a product discharge valve which operates based on data coming from the level measurement system, and wherein the radioactive sources are point sources and are installed in at least two different heights of the separation vessel, the radiation detectors are point detectors and are installed in at least three different heights of the separation vessel and attenuation of the radiation when passing through the separation vessel is measured.

2. The process according to claim 1, wherein the radiometric level measurement system comprises at least five radiation detectors, of which at least two are installed at the highest height, at least two are installed at the lowest height and at least one is installed at a height between the highest height and the lowest height.

3. The process according to claim 1, wherein the filling level is kept in a range of from a pre-defined minimum filling level to a pre-defined maximum filling level, and an emergency shutdown program is started if the filling level raises above the maximum filling level or the filling level decreases below the minimum filling level, and the emergency shutdown program, which is started if the filling level raises above the maximum filling level, is started based on data coming from one or more radiation detectors installed at the highest height of the installed radiation detectors and the emergency shutdown program, which is started if the filling level decreases below the minimum filling level, is started based on data coming from one or more radiation detectors installed at the lowest height of the installed radiation detectors.

4. The process according to claim 3, wherein two or three radiation detectors are installed at the highest height of the installed radiation detectors and two or three radiation detectors are installed at the lowest height of the installed radiation detectors and an emergency shutdown program is started if, in case two radiation detectors are installed at the same height, one of the two radiation detectors records a filling level above the maximum filling level or below the minimum filling level or, in case three radiation detectors are installed at the same height, two of the three radiation detectors record a filling level above the maximum filling level or below the minimum filling level.

5. The process according to claim 1, wherein, in the process of measuring the filling level of the liquid fraction in the separation vessel, data coming from one or more radiation detectors installed at the highest height of the installed radiation detectors are utilized as online compensation signals regarding the radiation attenuation of the gaseous fraction within the separation vessel.

6. The process according to claim 1, wherein the reaction mixture enters the separation vessel through an inlet pipe which is centrally arranged in the separation vessel and extends vertically from the top into the vessel.

7. The process according to claim 6, wherein the inlet pipe extends for a distance into the separation vessel which is from 25% to 40% of the length of the separation vessel.

8. The process according to claim 1, wherein the separation vessel has a vertically arranged cylindrical shape with a ratio of length to diameter L/D of from 4-10.

9. A process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor comprising a process for separating polymeric and gaseous components according to claim 1.

10. The process according to claim 9, wherein the polymerization is carried out in one or more tubular reactors or autoclave reactors or combinations of such reactors.

* * * * *